June 9, 1925.
J. REGENSTEIN
1,541,587
TRIMMING THE INTERIORS OF VEHICLES AND THE LIKE
Filed Sept. 7, 1922    2 Sheets-Sheet 1
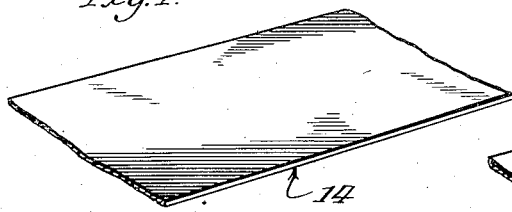
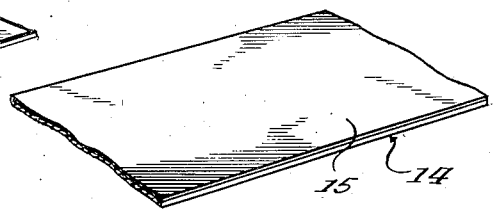
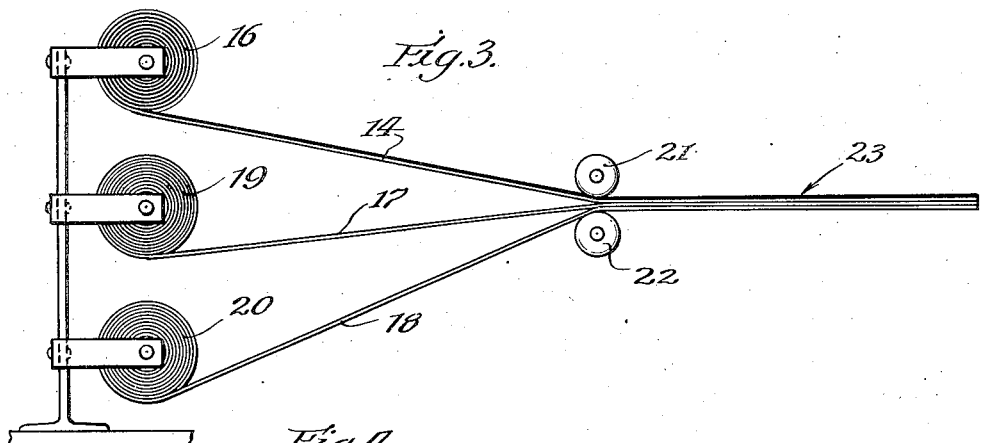
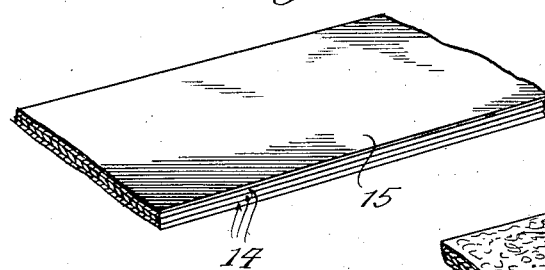
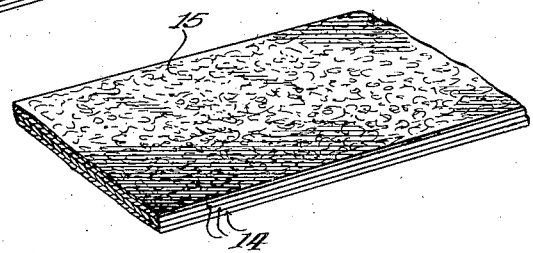
Inventor
Joseph Regenstein
by: [signature]    Attys.

June 9, 1925. 1,541,587
J. REGENSTEIN
TRIMMING THE INTERIORS OF VEHICLES AND THE LIKE
Filed Sept. 7, 1922   2 Sheets-Sheet 2

Inventor
Joseph Regenstein.
by
Attys.

Patented June 9, 1925.

1,541,587

UNITED STATES PATENT OFFICE.

JOSEPH REGENSTEIN, OF CHICAGO, ILLINOIS.

TRIMMING THE INTERIORS OF VEHICLES AND THE LIKE.

Application filed September 7, 1922. Serial No. 586,594.

*To all whom it may concern:*

Be it known that I, JOSEPH REGENSTEIN, a citizen of the United States, residing at Chicago, in the county of Cook and State of Illinois, have invented certain new and useful Improvements in Trimming the Interiors of Vehicles and the like, of which the following is a specification.

This invention has to do with certain improvements in the trimming of the interiors of vehicles such as automobiles, and also the manufacture of door panels and similar articles therefor. The trimming to which this invention particularly relates is specially intended for use in connection with automobile body doors and other interior portions.

One of the objects of the present invention is to provide a trimming and also a door panel made of paper board in the form of a series of sheets of a thin fiber board such as card board laid together and adhered together into a completed panel of the desired thickness, as distinguished from a panel made of pulp board or chip board as a single layer of the material of the necessary finished thickness.

I may state that it is desirable to produce a panel of considerable stiffness and strength so that it can successfully stand up under the service to which it is subjected in use; but which shall nevertheless be sufficiently pliable to be bent around such radii as encountered in finishing body interiors, without cracking or breaking the panels. It is also desirable to provide a panel which shall have its outer surface finished in such a manner as to resemble leather or upholstery cloth or other selected material.

One of the objects of the present invention is to provide a finished panel having its top or exposed surface so finished as to closely resemble leather, and it is further desired to secure this result without the necessity of using a layer of fabric or cloth on the paper board backing. The embossing of the exposed surface so as to simulate the leather or upholstery cloth ordinarily requires the proper treatment of the material in an embossing machine, and this can be done by feeding the sheets through an embossing machine in which the embossing is produced by rolls or flat plates. The surface to be embossed should first be coated and finished with shellac or other suitable water-proofing material, and this can be most easily and successfully and cheaply done by feeding the fiber board from a roll. It therefore becomes desirable to make use of relatively thin and somewhat flexible material during this operation.

One of the objects of the present invention is to provide the proper surface finish of suitable water proofing material on a relatively thin sheet of the material, and afterwards establish the necessary thickness and ultimate strength in the panel by adhering such sheet to one or more sheets of suitable material so as to produce the desired ultimate thickness, which can then be embossed. This embossing may be extended over the entire surface of the panel or just around its border, or the entire surface can be embossed and also a distinctive border can be embossed around its edge portion. In those cases in which the border is embossed the panel is given a distinctive finished appearance.

It may, therefore, be stated that one of the features of the invention consists in the provision of a method of manufacturing the door panels which consists in first providing a relatively thin sheet of fiber board with a surface of suitable finish material, and afterwards to provide the additional thickness necessary by adhering additional sheets of suitable material onto the back thereof. Afterwards the assembled sheet of completed thickness is embossed and cut up into the desired panels and the edge portions of these panels may either be left in the raw form or may be protected by stitching, or beading, or tape, or in any other suitable manner.

In connection with this method of manufacturing the panels, I wish to point out that the use of relatively thin fiber board for this class of work is very desirable, since it is possible, by using several thicknesses, to provide a panel which is sufficiently stiff and strong and is particularly well adapted for withstanding the rough service to which the door or other interior panels are subjected while at the same time being sufficiently pliable to be bent around the radii of automobile interiors without breaking or cracking. In these characteristics it is greatly superior to board made by the so-called wet machine process, which board, while being often made of sufficient thickness to establish the entire thickness of the panel, is not nearly as well adapted for use for a panel material, as is the relatively thin fiber board made on a cylinder machine.

In order that my improved form of panel and method of making the same may be more readily understood, reference may be had to the accompanying drawings in which—

Figure 1 shows a perspective view of a section of a strip of thin fiber board in the raw form and made on a cylinder machine;

Fig. 2 shows a view corresponding to Fig. 1 with the exception that the top surface of the panel has been coated with a waterproofing and glazing or coloring, or a waterproofing and glazing and coloring surface or finish, which is subsequently to be embossed;

Fig. 3 shows diagrammatically a simple form of machine for bringing together three thicknesses of the fiber board, including the top thickness which has been previously finished, and two additional base thicknesses;

Fig. 4 shows a perspective view of a fragment of material after being delivered from the machine of Fig. 3;

Fig. 5 shows a view similar to that of Fig. 4, with the exception that the material has been embossed;

Figure 6:
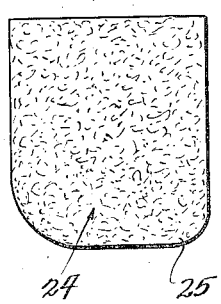
Fig. 6 shows a face view of a door panel cut out from the material of Fig. 5, said panel having raw edges.

Referring now to the figures, I first take a strip of relatively thin fiber board of proper specifications, designated as 14 in Fig. 1, and coat the top surface 15 with a layer of suitable water-proofing and finishing and coloring material of any suitable substance. This serves to protect the surface of the sheet in a water-proof manner and at the same time gives it the desired color and finish. This coating operation is most conveniently performed in a cylinder machine or the like, and for this purpose the sheet of material should be relatively thin, say, twenty-three thousands of an inch in thickness or thereabouts. This thickness is sufficient to provide a sheet which can be readily handled for the coating operation, but which sheet is not thick enough to give the necessary strength and rigidity to the completed panel.

I, therefore, take the sheet treated as in Fig. 2, which may be wound into a roll 16, as shown in Fig. 3, and back it up with one or more sheets 17 and 18 of similar material which may be drawn from the rolls 19 and 20. The sheets 17 and 18 may be raw and not provided with any finishing surface 15, but are preferably composed of material of substantially the same thickness and specifications as those of the sheet 14. All three of the sheets 14, 17, and 18 are drawn together between the rolls 21 and 22 of the machine, so that suitable adhesive previously applied to their adjoining faces will unite them into a solid compact board 23 whose upper surface is provided with the finishing coating 15 of Fig. 2. In many cases it will also be desirable to "finish" the back surface of the completed article so as to water proof the same. In such cases the bottom sheet 18 may have its bottom surface so "finished" before the sheets are assembled in the machine, so that the finally assembled sheet of a plurality of layers will have both its top and bottom surfaces "finished" with suitable water proofing material.

After establishing the board 23 in the machine of Fig. 3, I emboss the top finished surface 15, as shown in Fig. 5. This embossing operation may be performed in any suitable embossing machine which acts directly upon the surface 15. The embossing operation may extend clear through all of the thicknesses of the board, or only through into the top surface, as desired. Ordinarily it may be sufficient to carry the embossing action only into the top surface since the pressure necessary to carry it all the way through would, in some cases, be excessive.

Figure 7:
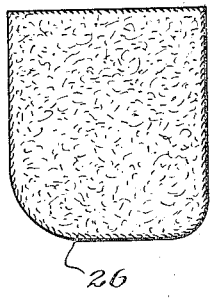
Fig. 7 shows a view similar to that of Fig. 6, with the exception that the edge of the door panel is provided with a line of stitching so as to protect the same to a greater or less degree.
Figure 8:
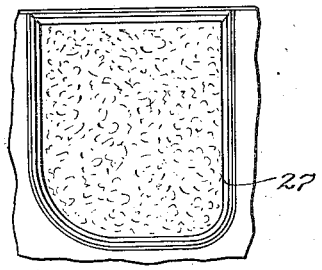
Fig. 8 shows a view similar to that of Fig. 7, with the exception that the edge of the door panel is protected by a strip of binding tape.
Figure 9:
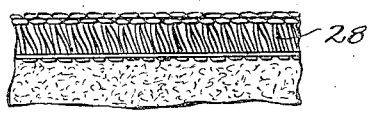
Fig. 9 shows on enlarged scale a fragmentary view of a portion of a door panel edge having one form of stitching thereon.
Figure 10:
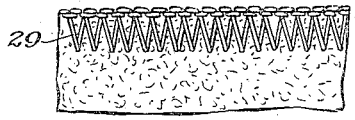
Fig. 10 shows a view similar to that of Fig. 9, with the exception that it is provided with a different form of stitching.
Figure 11:
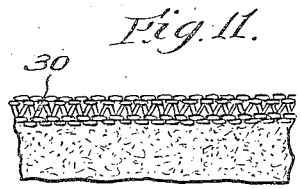
Fig. 11 shows a view similar to Figs. 9 and 10, with the exception that it shows still another different form of stitching.
Figure 12:
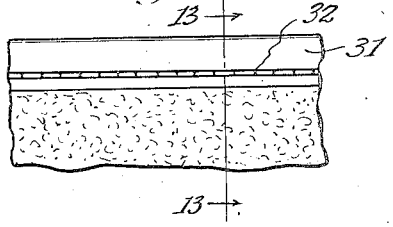
Fig. 12 shows a fragmentary view of the edge portion of a door panel which is protected by a strip of tape.
Figure 13:
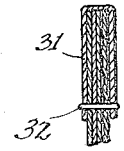
Fig. 13 shows a cross section taken on line 13—13 of Fig. 12, looking in the direction of the arrows.

After embossing the board, as shown in Fig. 5, it may be cut into independent panels 24, as shown in Fig. 6. The edge portions 25 of these panels may be left plain and unprotected, as shown in Fig. 6, or may be provided with a protecting line of stitching 26, as shown in Fig. 7, or with a binding tape 27, as shown in Fig. 8. The stitching, when used, may be of any suitable form. In Figs. 9, 10, and 11 I have shown three forms of this stitching designated 28, 29, and 30, respectively. In Figs. 12 and 13 I have shown a strip of tape 31 as being provided along the edge of the panel and united thereto by a line of stitching 32 which extends clear through the thicknesses of the panel.

While I have herein shown and described only certain embodiments of the features of the present invention and only a single process for carrying the invention into practice, still I do not limit myself to the said embodiments or process except as I may do so in the claims.

I claim:

1. As a new article of manufacture, a panel for the purpose specified having sufficient strength to satisfactorily meet the requirements of service and sufficient pliability to be curved on the radii of automobile interior finishes, said panel comprising three sheets of fiber board adhered together by water proof adhesive, the exposed surfaces of the top and bottom sheets being coated with water proof material, and one exposed surface being embossed to simulate leather or the like, together with a suitable binder around the edge of the panel, substantially as described.

2. As a new article of manufacture, a panel for the purpose specified having sufficient strength to satisfactorily meet the requirements of service and sufficient pliability to be curved on the radii of automobile interior finishes, said panel comprising three sheets of fiber board adhered together by water proof adhesive, the exposed surfaces of the top and bottom sheets being coated with water proof material, and one exposed surface being embossed to simulate leather or the like, substantially as described.

3. As a new article of manufacture, a panel for the purpose specified having sufficient strength to satisfactorily meet the requirements of service and sufficient pliability to be curved on the radii of automobile interior finishes, said panel comprising exclusively a plurality of sheets of cylinder paper machine fiber board adhered together by suitable adhesive, the exposed surface of the top sheet being coated with water proof material and embossed to simulate leather or the like, substantially as described.

JOSEPH REGENSTEIN.